United States Patent
Caccavo et al.

(10) Patent No.: US 9,377,113 B2
(45) Date of Patent: Jun. 28, 2016

(54) SPHERICAL AUTOMATIC FLOW EMERGENCY RESTRICTOR VALVE

(71) Applicant: Mikron Valve & Manufacturer, Inc., Erie, PA (US)

(72) Inventors: Joseph Caccavo, Erie, PA (US); Patrick D. Smith, Fairview, PA (US); Paul R. Ostand, Charleston, WV (US)

(73) Assignee: Mikron Valve & Manufacturer, Inc., Erie, PA (US)

( * ) Notice: Subject to any disclaimer, the term of this patent is extended or adjusted under 35 U.S.C. 154(b) by 111 days.

(21) Appl. No.: 14/083,418

(22) Filed: Nov. 18, 2013

(65) Prior Publication Data

US 2015/0144208 A1    May 28, 2015

(51) Int. Cl.
*F16K 5/06* (2006.01)
*F16K 35/02* (2006.01)
*F16K 15/18* (2006.01)
*F16K 17/28* (2006.01)

(52) U.S. Cl.
CPC ............ *F16K 5/0605* (2013.01); *F16K 15/188* (2013.01); *F16K 17/285* (2013.01); *F16K 35/025* (2013.01); *Y10T 137/7841* (2015.04); *Y10T 137/8803* (2015.04)

(58) Field of Classification Search
CPC . F16K 15/183; F16K 37/0008; F16K 27/067; F16K 15/188; F16K 15/04; F16K 5/0652; F16K 5/0647; F16K 5/0626; F16K 5/0605; F16K 17/285; F16K 35/025; F16K 5/162; F16K 5/184; F16K 5/204; Y10T 137/2836; Y10T 137/87386; Y10T 137/87394; Y10T 137/88022; Y10T 137/8803; Y10T 137/88038; Y10T 137/88054; Y10T 137/7841; Y10T 137/6031; Y10T 137/6035; Y10T 137/524; Y10T 137/5153

USPC ............................ 137/599.17, 141, 599.18, 137/614.16–614.18, 614.2, 270.5, 269.5, 137/315.17, 315.18, 512.2; 251/309, 311, 251/315.01, 315.07, 315.08, 315.09, 160, 251/188, 192

See application file for complete search history.

(56) References Cited

U.S. PATENT DOCUMENTS

| | | | |
|---|---|---|---|
| 1,677,562 A | | 7/1928 | Lewis et al. |
| 2,598,598 A | | 5/1952 | Pierce ............................ 137/153 |
| 3,006,602 A | * | 10/1961 | Usab ..................... F16K 5/0615 251/315.13 |
| 3,830,693 A | * | 8/1974 | Beser et al. .................... 251/159 |
| 4,542,878 A | | 9/1985 | Kulisek .......................... 251/315 |
| 4,671,308 A | * | 6/1987 | Williams et al. ................ 137/72 |
| 4,690,169 A | * | 9/1987 | Jobe .......................... 137/614.16 |
| 4,747,427 A | * | 5/1988 | Smith et al. .................... 137/270 |
| 5,263,685 A | * | 11/1993 | Winnike ................. F16K 5/204 251/163 |
| 5,435,521 A | | 7/1995 | Jarecki ...................... 251/315.16 |
| 5,588,638 A | | 12/1996 | Bunting et al. ........... 251/315.05 |
| 6,173,940 B1 | | 1/2001 | Kardohely et al. ........... 251/283 |
| 764,900 A1 | | 7/2004 | Schalt |
| 7,059,585 B2 | | 6/2006 | Dalluge et al. ........... 251/315.16 |
| 2011/0253922 A1 | | 10/2011 | Hughes et al. ........... 251/315.01 |

* cited by examiner

*Primary Examiner* — Michael R Reid
(74) *Attorney, Agent, or Firm* — Bauer Law Offices; Robert M. Bauer

(57) ABSTRACT

A ball check valve controls the flow of fluid with a sphere. A body has a fluid path and a recess for receiving the sphere in alignment with the fluid path. The sphere has a retainer which secures a ball check within it. When the valve is in a "Run" position and the rate of fluid flow increases, the ball check seats in a narrow opening of the sphere, thus blocking the flow of fluid.

14 Claims, 9 Drawing Sheets

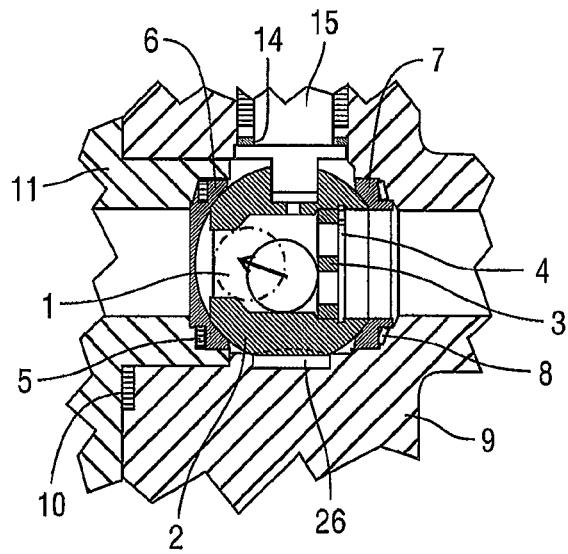
*Fig.2A*
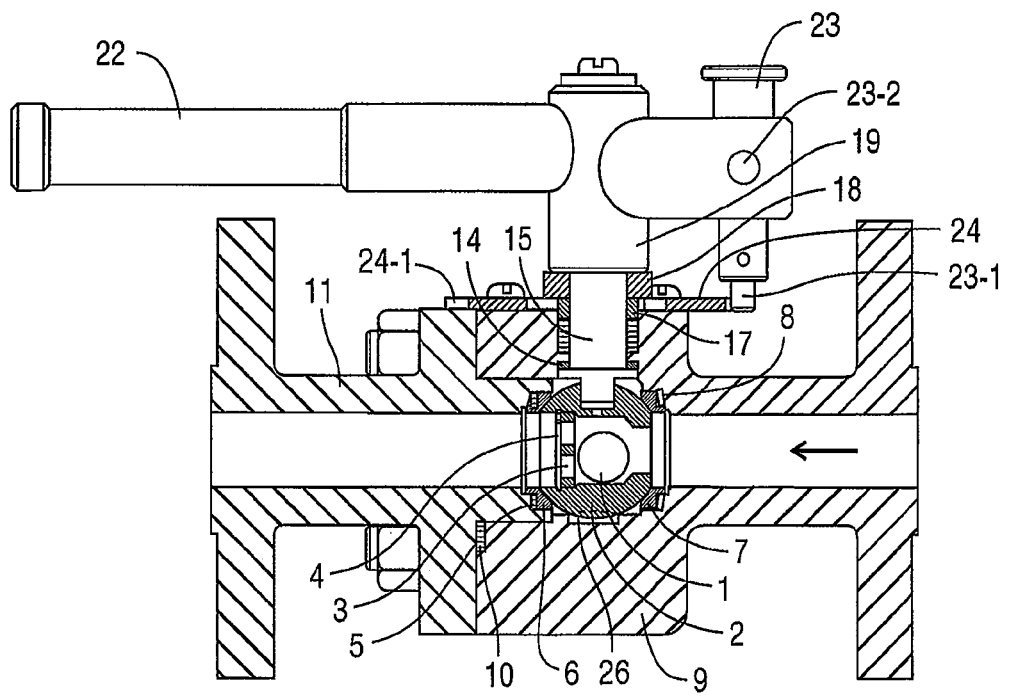
*Fig.3*  *Bypass*

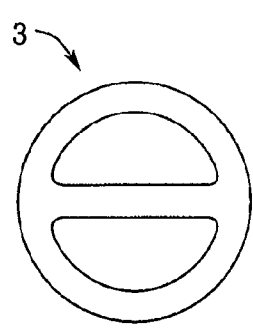 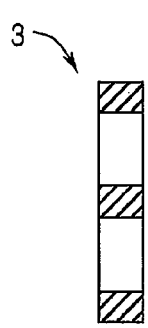 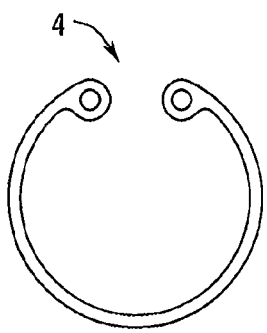 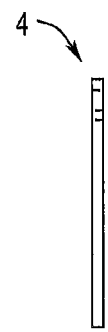
*Fig.6A*   *Fig.6B*   *Fig.7A*   *Fig.7B*
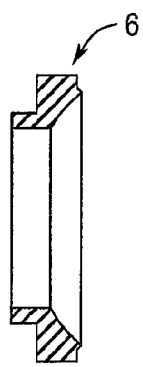 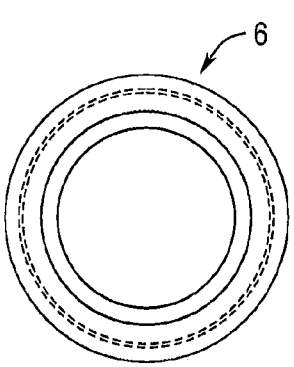 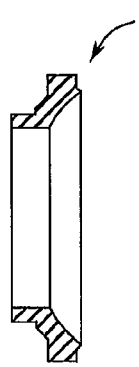 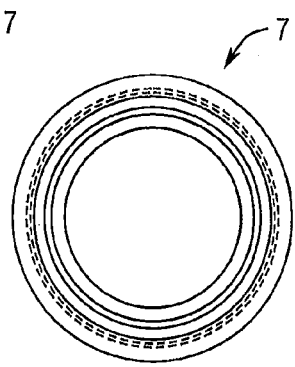
*Fig.8A*   *Fig.8B*   *Fig.9A*   *Fig.9B*

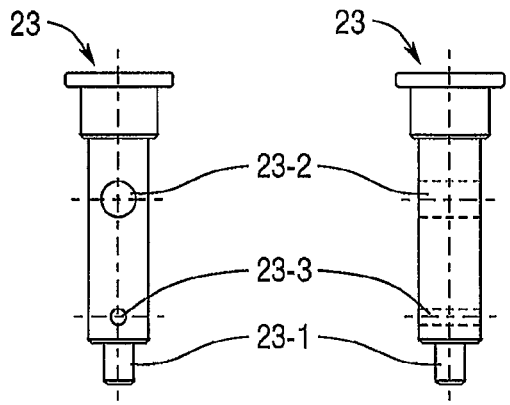
*Fig.12A*    *Fig.12B*
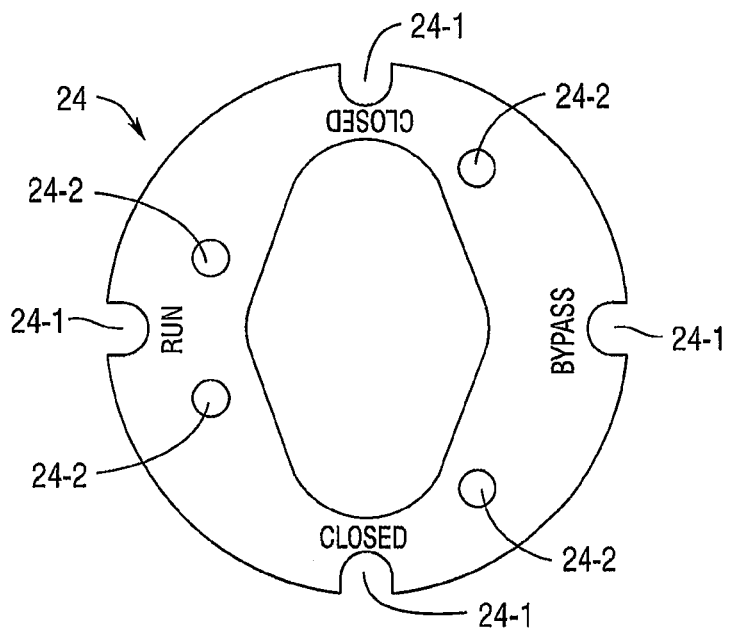
*Fig.13A*
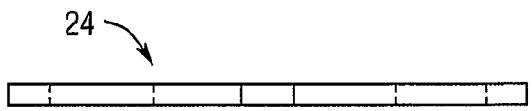
*Fig.13B*

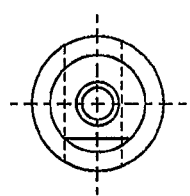
*Fig.14A*
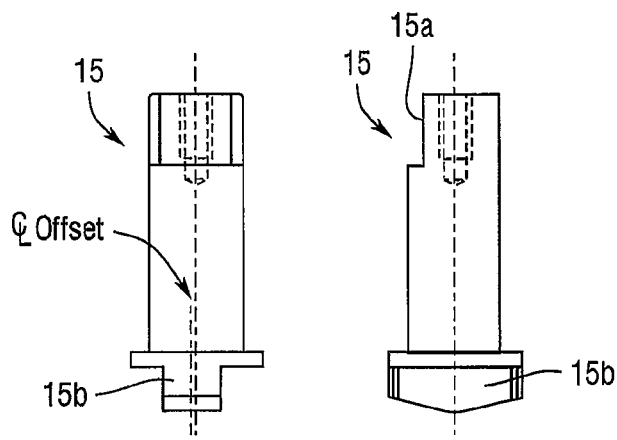
*Fig.14B*  *Fig.14C*

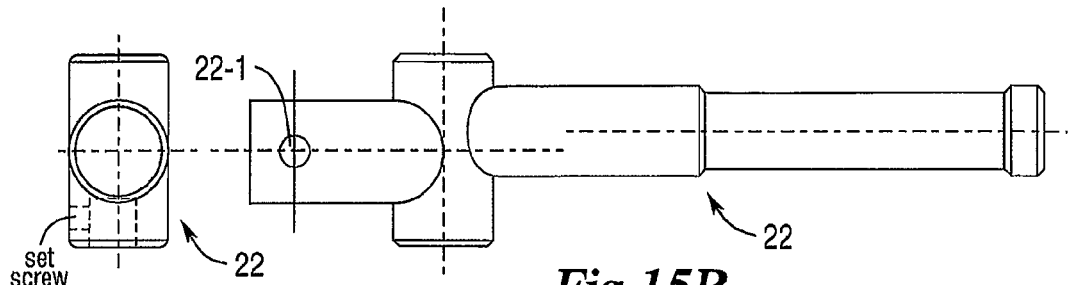
*Fig.15A*  *Fig.15B*
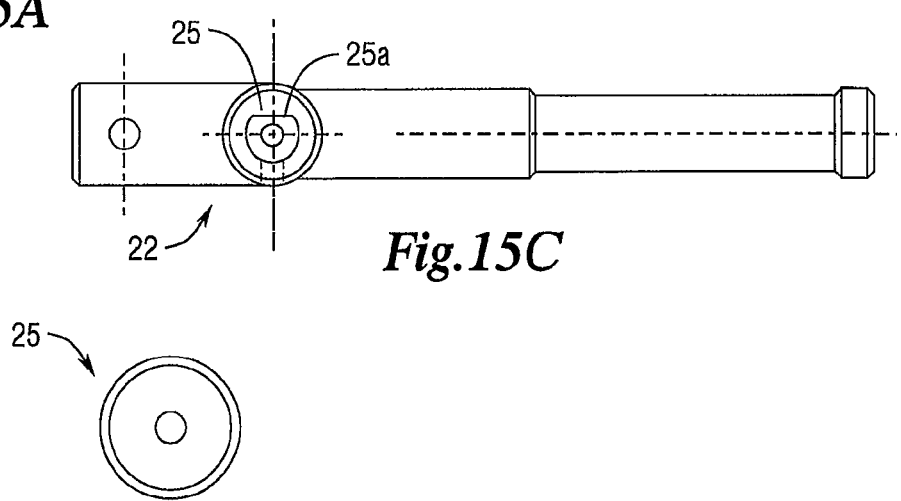
*Fig.15C*
*Fig.16A*
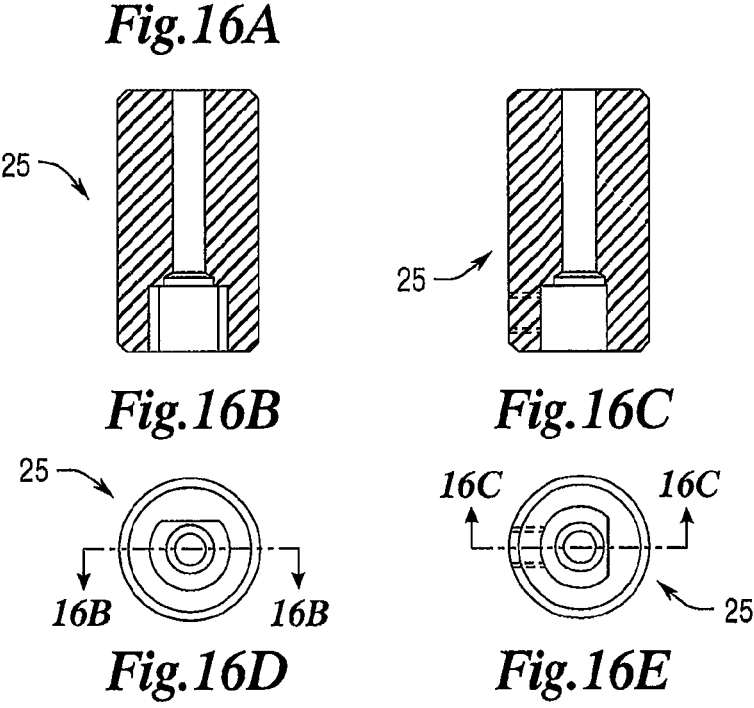
*Fig.16B*  *Fig.16C*
*Fig.16D*  *Fig.16E*

US 9,377,113 B2

SPHERICAL AUTOMATIC FLOW EMERGENCY RESTRICTOR VALVE

FIELD OF THE INVENTION

The invention relates generally to valves. In particular, the invention relates to ball check valves.

BACKGROUND

A ball check valve has a ball which should block the flow of fluid when the flow becomes excessive due to an external leak or other event downstream from the valve. For example, a sight glass may break. It is desired to stop the leak because the fluid may be hazardous, expensive or for cleanliness generally.

The ball check is normally in a resting position that permits free flow of fluid. If there is excessive flow, the ball check has to be moved to a seated position that should block the flow. The ball should move from the resting position to the blocking position at a situation of excess flow. When the ball is in the blocking position, the inlet pressure maintains the ball check in that position.

Currently known ball check valves are susceptible to leakage, breakage and jamming after repeated use. Ball check valves can also be unreliable in operation, particularly for certain fluids such as petroleum. There may be a buildup on interior surfaces of the valve or a contaminant can become lodged between an interior surface and the ball. In severe cases, the valve may become inoperative due to the ball check not seating properly, allowing fluid to flow past the ball check.

A specific example of an inadequate prior art ball check valve is shown in FIG. 17. It is a sleevable/plug type where a valve plug is inserted into a unitary body. The valve plug is tapered, with distinct sides. The position the check ball is supposed to be in when blocking the flow of fluid (shown in dashed outline) is easily impeded. The prior art valve uses an upward projection, which is susceptible to bending or even breaking, and may be difficult or expensive to manufacture. As a metal pin, tapered and pressed into a taper hole in the plug, there is no seal and the valve can have minor leakage.

BRIEF DESCRIPTION OF THE DRAWINGS

A complete understanding of the preferred embodiments will be obtained from the following description when taken in connection with the accompanying drawing figures, wherein like reference numerals identify the same parts throughout.

FIG. 2A is an exploded side cross-sectional view of the valve in FIG. 2 showing the resting position of the ball in solid outline and the position of the ball when seated to block fluid flow in dashed outline.

FIG. 3 is a side cross-sectional view of the valve in FIG. 1 with the valve in the "Bypass" position.

FIG. 6A is an end view of the retainer 3 in the valve shown in FIG. 2A.

FIG. 6B is a cross-sectional view of the retainer in FIG. 6A.

FIG. 7A is an end view of the retainer clip 4 in the valve shown in FIG. 2A.

FIG. 7B is a cross-sectional view of the retainer clip in FIG. 7A.

FIG. 8A is a cross-section view of the downstream seat 6 shown in the valve in FIG. 2A.

FIG. 8B is an end view of the downstream seat 6 in FIG. 8A.

FIG. 9A is a cross-section view of the guide seat 7 in the valve shown in FIG. 2A.

FIG. 9B is an end view of the guide seat 7 in FIG. 9A.

FIG. 12A is a view of a guide post 23 in the preferred embodiment of the valve in FIG. 1 which shows a guide tip 23-1 of guide post 23, a hole 23-2 for a possible lock or locking pin and hole 23-3 for a stop pin 25.

FIG. 12B is a view of guide post 23 in which guide post 23 is turned 90 degrees from the view shown in FIG. 12A.

FIG. 13A is at top view of a locking plate 24 in the preferred embodiment of the valve shown in FIG. 1.

FIG. 13B is a side view of the locking plate 24 shown in FIG. 13A.

FIG. 14A is a top view of the stem 15 in the preferred embodiment of the valve shown in FIG. 1.

FIG. 14B is a side view of stem 15 in FIG. 14A showing the end of a tab 15b that engages with the top slot of sphere 2 and that is offset with respect to the center of stem 15.

FIG. 14C is a side view of stem 15 in FIG. 14A showing the side of the tab 15b that engages with the top slot of sphere 2 and that is offset with respect to the center of stem 15.

FIG. 15A is an end view of the handle 22 in the preferred embodiment of the valve shown in FIG. 1.

FIG. 15B is a side view of the handle 22 in the preferred embodiment of the valve shown in FIG. 1.

FIG. 15C is a bottom view of the handle 22 in the preferred embodiment of the valve shown in FIG. 1.

FIG. 16A is a view of the hub 25 for handle 22 in the preferred embodiment of the valve shown in FIG. 1.

FIG. 16B is a cross-sectional view of hub 25 along line 16B-16 B shown in FIG. 16D.

FIG. 16C is a cross-sectional view of hub 25 along line 16C-16C shown in FIG. 16E.

FIG. 16D is a bottom view of hub 25 shown in FIG. 16A.

FIG. 16E is a bottom view of hub 25 at a 90 degree rotation from the bottom view of hub 25 shown in FIG. 16D.

DETAILED DESCRIPTION OF THE PREFERRED EMBODIMENTS

Figure 1:
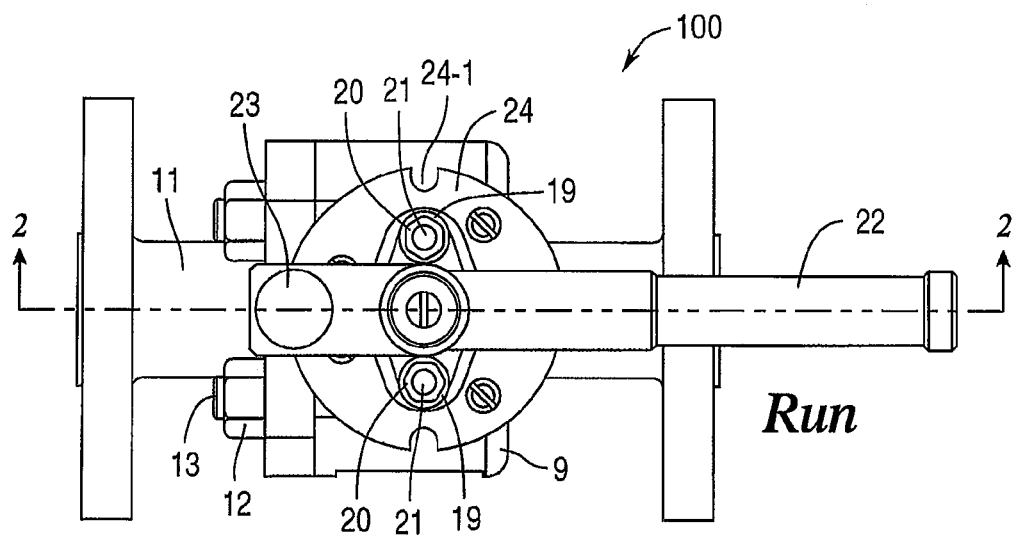
FIG. 1 is a top view of a valve according to a preferred embodiment of the invention, shown in the "Run" position.
Figure 2:
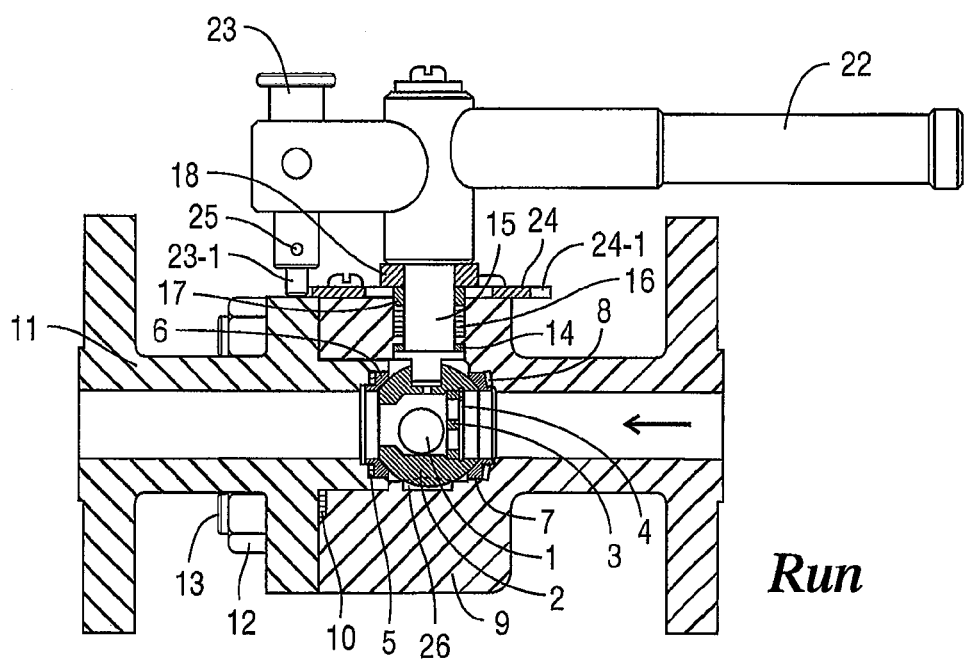
FIG. 2 is a side cross-sectional view of the valve along line 2-2 in FIG. 1 with the valve in the "Run" position.

A preferred embodiment of the invention is shown in FIGS. 1-16 with reference to the following listing of constituent parts:

100 valve
1 ball check
2 sphere
3 retainer
4 retainer clip 5 seat gasket
6 downstream seat
7 guide seat
8 disc spring
9 body
10 body gasket
11 end
12 nut
13 stud
14 thrust washer
15 stem
16 stem packing
17 gland ring
18 gland follower
19 belleville washer
22 handle
23 guide post
24 locking plate
25 stop pin The preferred embodiment of the valve according to the invention utilizes a body 9 and end part 11, with aligned fluid paths as shown in FIGS. 1-3. Body 9 and end 11 are of materials commensurate with the application, for example stainless steel or black oxide coated carbon steel. The valve is assembled by placing sphere 2 into a recess in body 9. The recess is formed so that the sphere 2 fluid path aligns with the fluid path of body 9.

Preferably, a guide seat 7 is provided to align and fit the sphere 2 to body 9, and a disc spring 8 biases the guide seat against sphere 2. The curved surface of guide seat 7 mates the curved surface of sphere 2. A downstream seat 6 and seat gasket 5 fit and align the sphere 2 to end 11. The curved surface of downstream seat 6 mates the outer curve of sphere 2. The seat materials may be commensurate with the application, for example, metal or soft-seated. As shown in FIGS. 2, 2A, 3 and 10, there may be a notch, undercut or indentation 26 in the body cavity to facilitate the assembly of the stem into the body. It is preferably as narrow as necessary to accommodate the stem Body 9 and end 11 can be joined in any suitable manner, but preferably with nuts 12 and 13 as shown in FIGS. 1 and 2.

Figure 4A:
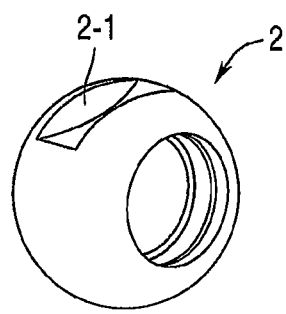
FIG. 4A is a perspective view of the sphere of the valve in FIG. 1.
Figure 5A:
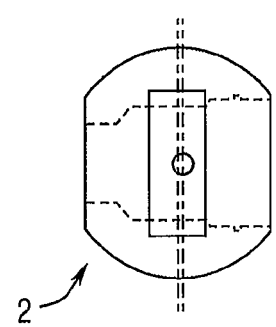
FIG. 5A is a top view of the sphere shown in FIG. 4A with the concave slot offset from the pivot point in solid line, and the valve cavity of the sphere in dashed lines.
Figure 4B:
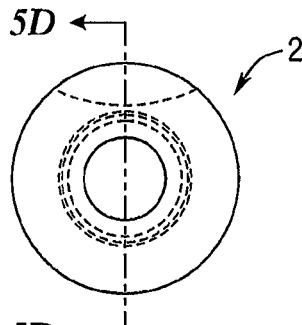
FIG. 4B is a view showing one opening of the sphere shown in FIG. 5A in solid lines, the offset concave slot on the top of the sphere in dashed line, and the other opening and parts in dashed lines.
Figure 5B:
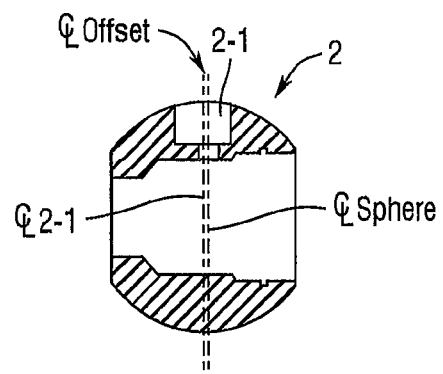
FIG. 5B is a cross-sectional view of the sphere in FIG. 4B along the line 5D-5D shown in FIG. 4B.
Figure 10:
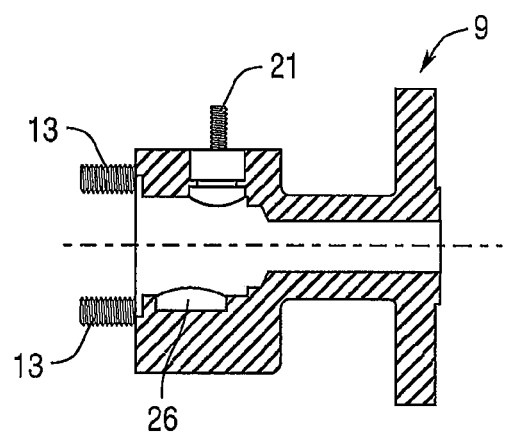
FIG. 10 is a cross-sectional view of body 9 according to a preferred embodiment of the invention.
Figure 11:
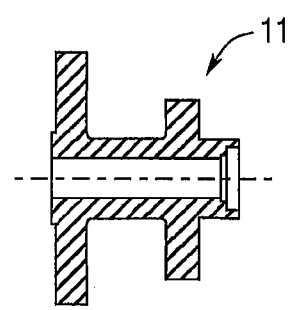
FIG. 11 is a cross-sectional view of end 11 according to a preferred embodiment of the invention.
Figure 17:
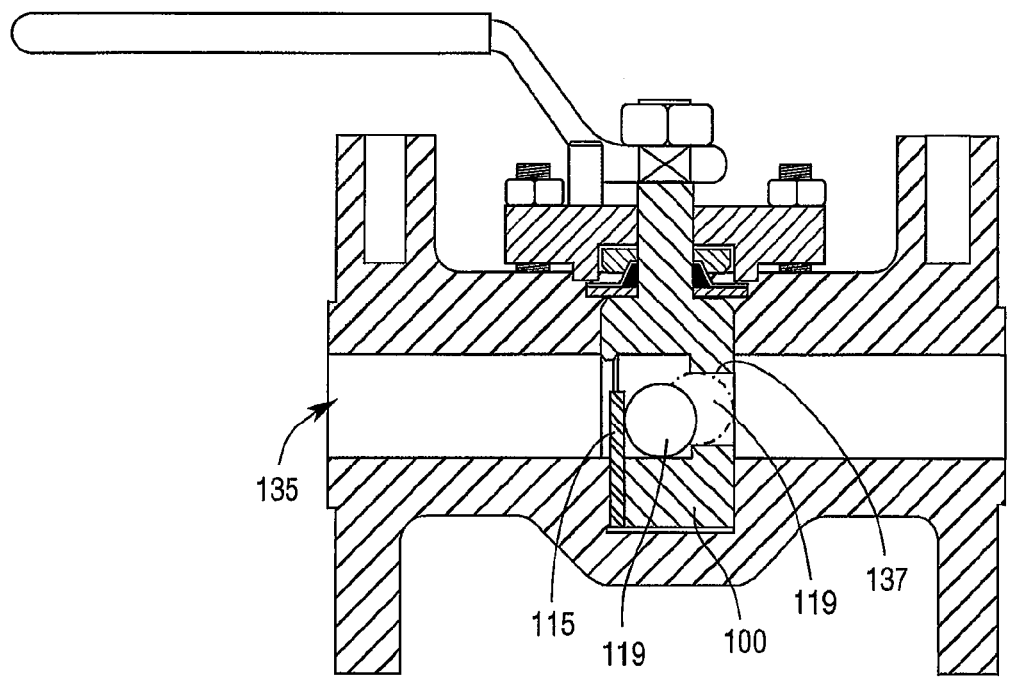
FIG. 17 is a side cross sectional view of a prior art sleeved ball check valve.

The sphere 2 is operated by stem 15 in conjunction with thrust washer 14, stem packing 16, gland ring 17, gland follower 18, Belleville washers 19, packing nuts 20 and packing studs 21. As shown in FIGS. 4-5, sphere 2 has a concave slot at the top which receives the lower portion 15b of stem 15. The stem 15 preferably uses "ultra-low emission" packing and is rotated using handle 22 to rotate sphere 2. As best seen in FIG. 13A, the valve provides a "Run", "Bypass" and two "Off" positions. The "Bypass" position shown in FIG. 3 allows the fluid to flow freely around the ball check in order to evaluate for blockage, flushing and proper operation of the fluid system. The handle 22, stem 15 and sphere 2 can be rotated substantially 180 degrees to the "Run" position shown in FIGS. 1 and 2. If the sight glass or piping to which the valve is connected downstream should be compromised or leaking, the resulting fluid dynamics of the outflow will cause the ball check 1 in sphere 2 to move from the resting position (shown by solid lines in FIGS. 2 and 2A) to the blocking position (shown by dashed lines in FIG. 2A). If handle 22 is rotated 90 degrees (in either direction), then the valve is in an "Off" position (not shown in the drawings) in which the sphere 2 does not align with the fluid paths in body 9 and end 11, and the valve thus isolates fluid flow on either side of the valve. The geometry allows for two opposed "OFF" positions and the non-symmetrical pattern of holes 24-2 prevents improper assembly of the locking plate 24.

The preferred embodiment shown in FIG. 1 uses a locking plate 24 as shown in FIGS. 13A and 13B. Notches 24-1 on the periphery of guide plate 24 correspond to the "Bypass", "Run" and "Off" positions. A guide post 23 on the opposite side from handle 22 slides vertically so that tip 23-1 can engage one of the notches on the periphery of guide plate 24. Thus, in order to change the valve position, it is not sufficient to merely rotate handle 22; guide post 23 must first be lifted to clear the corresponding notch. A hole 23-2 is provided through guide post 23 and aligns with hole 22-1 in handle 22. A lockpin or padlock can be provided in hole 23-2 and through hole 22-1 in handle 22 to prevent the guide post 23 from being lifted to clear the notch on locking plate 24. An exemplary guide post is shown in FIGS. 12A and 12B.

As shown in FIGS. 4-5 and 14B-14C, the slot 2-1 in sphere 2 and the tab 15b at the bottom of stem 15 are equally offset from center. The amount of offset may be relatively slight or not. The asymmetric alignment of locking plate mounting holes 24-2 align locking plate 24, and the engraved lettering correctly with respect to the sphere 2, stem 15 and handle 22. The flat 15a, likewise locates on flat 25a, which aligns the stem to the handle. These prevent the valve from being assembled incorrectly with the handle in an incorrect orientation. The sphere can be rotated freely about the axis of the stem but the positions thereof are preferably determined by the notches in the locking plate 24. The exploded view of FIG. 2A shows the valve in the "Run" position. The interior space of sphere 2 is configured so that the resting position of the ball is shown by a solid outline. The ball check 1 is confined within one end of sphere 2 while fluid is allowed to pass by a retainer 3 secured by a retainer clip 4. Preferably, retainer 3 is in circular form and nests into a counter bore, and retainer clip 4 is located in an adjacent groove, in sphere 2. Preferred embodiments of the retainer 3, with a member across its face to provide two "D" shaped passages, and retainer clip 4 are shown in FIGS. 6A, 6B, 7A and 7B, but other embodiments may be utilized as well. Although retainer 3 is shown in a horizontal position in the drawings, the retainer 3 preferably can rotate within the groove in sphere 2.

When the fluid flow rate is excessive fluid dynamics will cause ball check 1 to be moved from its resting position and become seated in the narrow opening of sphere 2 at the position indicated by the dashed outline in FIG. 2A.

The seat gasket 5, downstream seat 6, guide seat 7 and disc spring 8 are used for sealing and securing the position of sphere 2 and supporting it during rotation between different positions. They play no part in restraining the ball check 1 within sphere 2. Both the ball check 1 and the sphere 2 are preferably comprised of smooth finished material to reduce resistance to movement of the ball and clogging of the valve by viscous fluids.

What is claimed is:

1. A ball check valve for controlling the excess flow of fluid, comprising:
   a sphere with a flow passage through the sphere, a ball check contained entirely within the flow passage;
   a body having a fluid path and a recess in the body receiving the sphere such that it is aligned with the fluid path of the body; and
   a rotating stem mated to the sphere through the body of the valve and oriented to rotate the sphere in conjunction with the stem about a rotational center, a mating connection between the end of the stem and the sphere having only a single tab on the stem sized to fit only a single slot on a top of the sphere and, the single tab of the stem and the single slot on the top of the sphere being offset from the rotational center of the stem.

2. The ball check valve recited in claim 1, wherein the sphere has a retainer securing the ball check inside the sphere.

3. The ball check valve as recited in claim 1, further comprising an upstream guide seat and a disc spring shaped and configured to position the sphere in alignment with the fluid path of the body.

4. The ball check valve as recited in claim 1, further comprising a downstream seat and a seat gasket shaped and configured to position the sphere in alignment with the fluid path of the body, and to provide seating from fluid passing around the circumference of the sphere and around the downstream seat.

5. The ball check valve as recited in claim 1, wherein the sphere has interior surfaces providing a seating position of the ball check restricting fluid flow when the valve is in a "Run" position and the fluid flow rate becomes excessive.

6. The ball check valve as recited in claim 5, wherein the seating position of the ball check is formed by a narrow opening inside the sphere.

7. The ball check valve as recited in claim 6, wherein the narrow opening of the sphere is a conical shape on the interior thereof.

8. The ball check valve as recited in claim 6, wherein the sphere has a larger opening for fluid flow that is greater than a diameter of the ball check.

9. A ball check valve, comprising:
   a sphere;
   a ball check contained entirely within a flow passage through the sphere;
   a stem mated to the sphere and oriented to rotate about an axis perpendicular to the flow passage through the sphere, a flat on a first end of said stem; and
   a handle with a flat cavity that mates in proper orientation with the flat on said stem, said handle rotating both of said stem and said sphere in common a full 360 degrees about said axis such that each one of a plurality of different orientations of said handle corresponds to a different respective orientation of said sphere, the ball check valve operating differently for at least three of said plurality of different orientations,
   a mating connection between a second end of said stem and said sphere having only a single tab on said stem and only a single slot on said sphere; said single tab and said single slot being offset from the common axis of said stem and sphere; said offset insures that said sphere, stem and handle can only be assembled in one, correct, orientation.

10. The ball check valve recited in claim 9, wherein the valve further comprises a locking plate, the locking plate defining at least three different positions for the valve, wherein the locking plate can only be installed on the valve in one, correct, orientation.

11. The ball check valve recited in claim 10, wherein the locking plate includes text associated with each one of the at least three different positions and the correct orientation is consistent with the text on the locking plate.

12. The ball check valve of claim 9, wherein said single tab and said single slot have a rectangular cross-section in a plane perpendicular to said axis.

13. The ball check valve of claim 10, wherein said single tab has an end surface, said end surface having a curvature, and said single slot has a mating surface which mates with said end surface of said single tab, said mating surface of said single slot having the same curvature as the end surface of said single tab.

14. The ball check valve of claim 9, wherein a diameter of the flow passage is not the same throughout the sphere.

* * * * *